United States Patent [19]

Kanagawa et al.

[11] 4,211,715
[45] Jul. 8, 1980

[54] EPOXY RESINS AND PROCESS FOR PRODUCING THE SAME

[75] Inventors: Shuichi Kanagawa, Osaka; Shinji Nakao, Sakai; Kiyoshi Nakai; Kunimasa Kamio, both of Toyonaka; Shunsuke Matsushima, Otsu; Kazuhiko Hata, Niihama; Kentaro Mashita, Ibaraki, all of Japan

[73] Assignee: Sumitomo Chemical Company, Limited, Osaka, Japan

[21] Appl. No.: 909,785

[22] Filed: May 26, 1978

[30] Foreign Application Priority Data

May 27, 1977 [JP] Japan .................. 52-62407

[51] Int. Cl.² .......................................... C07D 303/28
[52] U.S. Cl. .................. 260/348.64; 528/97; 568/719
[58] Field of Search ............ 260/348.64, 348.15; 568/719

[56] References Cited

U.S. PATENT DOCUMENTS

| | | | |
|---|---|---|---|
| 3,264,357 | 8/1966 | Webb et al. | 568/719 |
| 3,264,358 | 8/1966 | Webb et al. | 568/719 |
| 3,384,617 | 5/1968 | Casale | 568/719 |

FOREIGN PATENT DOCUMENTS

| | | |
|---|---|---|
| 1004168 | 8/1957 | Fed. Rep. of Germany . |
| 1000 | 1/1974 | Japan . |
| 50393 | 4/1977 | Japan . |
| 903062 | 8/1962 | United Kingdom . |

OTHER PUBLICATIONS

Friedrich Wolf et al, Z. Chem., vol. 12 (1972) No. 5, pp. 180–181.

*Primary Examiner*—Norma S. Milestone
*Attorney, Agent, or Firm*—Stevens, Davis, Miller & Mosher

[57] ABSTRACT

An epoxy resin of the formulae (I) and/or (II),

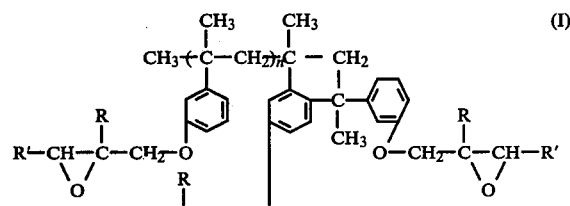

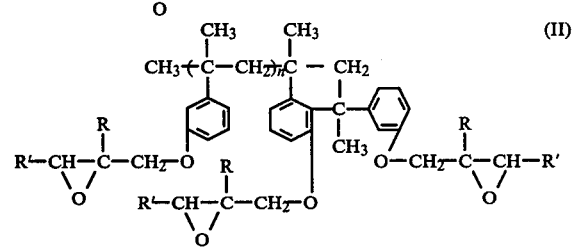

wherein R and R' are each hydrogen atom or an alkyl group having 1 to 3 carbon atoms and n is a mean value satisfying the equation, $0 < n \leq 2$, which is excellent in heat resistance, flexibility, curability and the like, and is useful in paints, adhesives, civil engineering and construction industry, electric appliances and the like.

2 Claims, No Drawings

EPOXY RESINS AND PROCESS FOR PRODUCING THE SAME

The present invention relates to a novel epoxy resin and a process for producing the same.

In general, epoxy resins are widely used in paints, adhesives, civil engineering and construction industry, electric appliances and the like because of their chemical and physical properties, and are required to have properties such as heat resistance, high hardness, flexibility and rapid curability according to the purposes of use. Since, however, epoxy resins which meet all these characteristics at the same time are not yet known, some kinds of epoxy resin are mixed in suitable amounts and used. For example, German Patent No. 1,004,168 and English Patent No. 903,062 disclose epoxy resins resulting from cyclic dimers of m- or p-isopropenylphenol, i.e. an isopropenylphenol dimer having the so-called phenylindane structure at the end thereof. Japanese Patent Publication No. 1,000/1974 discloses epoxy resins resulting from polymers of vinylphenols such as isopropenylphenol. The former resins are superior in flexibility but still insufficient in heat resistance and rapid curability. The latter resins have the drawback that they are inferior in flexibility since they have no phenylindane structure at the end.

For the reasons as described above, the inventors extensively studied to develop epoxy resins which satisfy heat resistance, flexibility, rapid curability and other properties at the same time, and besides which are superior in these properties to known epoxy resins. As a result, it was found that epoxy resins having a specified structure which are produced from m-isopropenylphenol oligomers having a phenylindane structure at the end, are very useful for the aforesaid purposes.

The present invention provides an epoxy resin of the formulae (I) and/or (II),

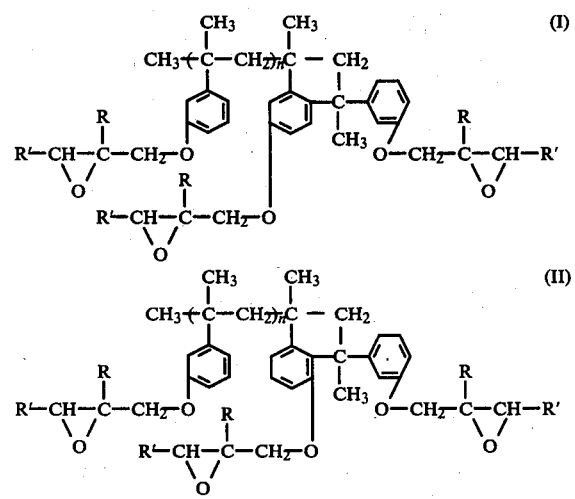

wherein R and R' are each a hydrogen atom or an alkyl group having 1 to 3 carbon atoms and n is a mean value satisfying the equation, $0 < n \leq 2$, and also provides a process for producing the above epoxy resin, which comprises reacting an oligomer of m-isopropenylphenol having a number average molecular weight of 270 to 540, and having the formulae (III) and/or (IV).

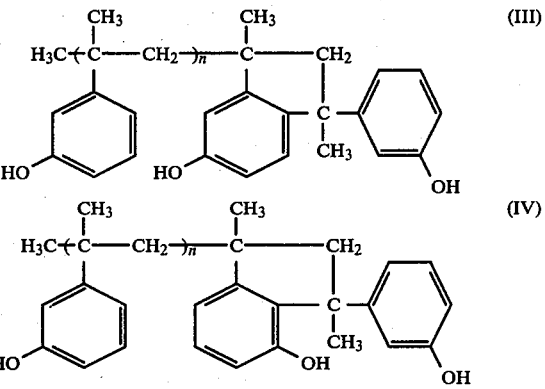

wherein n is as defined above, with an epihalohydrin of the formula,

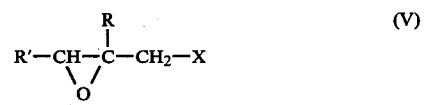

wherein R and R' are as defined above and X is a halogen atom, in the presence of an alkaline compound, the epihalohydrin being used in 2 moles or more per one hydroxy group of the oligomer.

An epoxy equivalent of the present epoxy resin is 190 to 300.

The m-isopropenylphenol oligomers represented by the formulae (III) and (IV) can be produced by polymerization of m-isopropenylphenol. For the purpose of the present invention, the oligomers having a phenylindane structure at the end and a number average molecular weight of 270 to 540, preferably 300 to 500 are used. As a polymerization process for producing such oligomers satisfying these requirements, thermal polymerization which is carried out at 140° C. or more, preferably 160° to 240° C., in the absence of a solvent, is advantageous industrially. The oligomers can also be obtained by polymerization with a catalyst under suitable conditions such as polymerization temperature and the amount of catalyst to control the molecular weight, but a troublesome after-treatment of catalyst is necessary, and moreover the resulting oligomers tend to become poor in color.

In the thermal polymerization, use of solvents or a reaction temperature below 140° C. lowers the yield of the objective oligomers. It is accordingly desirable to carry out the polymerization at 140° C. or more in the absence of a solvent. Further, the oligomers having a good color are obtained by carrying out the polymerization in an atmosphere of inert gas such as nitrogen gas. It matters little that small amounts of high molecular weight components are produced as by-products in the thermal polymerization.

As the epihalohydrin used in the present invention, there may be mentioned epichlorohydrin, β-methylepichlorohydrin, 1-chloro-2,3-epoxybutane, 1-chloro-2,3-epoxypentane, 1-chloro-2,3-epoxyhexane, 1-bromo-2,3-epoxypropane, 1-bromo-2-methyl-2,3-epoxypropane, 1-bromo-2,3-epoxybutane and mixtures thereof. Particularly, epichlorohydrin is preferably used.

The resins of the present invention can be produced by reacting the aforesaid m-isopropenylphenol oligomer with the epihalohydrin according to the usual method, for example, disclosed in literature "Epoxy Resins" by Hiroshi KAKIUCHI (published from Shōkō-dō). That is, the resins can be produced by adding an alkaline compound (e.g. lithium hydroxide, sodium hydroxide, potassium hydroxide, lithium chloride, tetra-methylammonium chloride, benzyl tri-methylammonium chloride, sodium carbonate), after the atmosphere is replaced by nitrogen gas if necessary, to a mixture of m-isopropenylphenol oligomer and the epihalohydrin or a solution of the mixture in a water-soluble solvent (e.g. acetone, methanol, ethanol, isopropanol, sec-butanol, n-butanol), and carrying out the reaction at 20° to 120° C., followed by removal of water and sodium chloride as by-products. The epihalohydrin is used in such an amount that the number of the epoxy groups of epihalohydrin is at least 2, preferably 3 to 10, based on one phenolic hydroxyl group of the oligomer. When the epihalohydrin is used in an amount less than that defined above, desired resins are not obtained since high polymers are produced whereby the epoxy equivalent exceeds 300. The aforesaid alkaline compound is generally used in a stoichiometric amount to the phenolic hydroxyl group or in a somewhat excessive amount thereto. The epoxy resins thus obtained are an almost semi-solid, pale yellow, highly viscous liquid at room temperature and have an epoxy equivalent of 190 to 300.

In the present invention, m-isopropenylphenol oligomer may be replaced by a mixture of m-isopropenylphenol oligomer and other suitable polyhydric phenols such as bis(4-hydroxyphenyl)dimethylmethane, bis(4-hydroxyphenyl)methane, resorcin, hydroquinone and novolak resin. The epoxy resins of the present invention may be used, if necessary, in combination with other well-known epoxy resins such as polyglycidyl ethers of polyhydric phenol or polyhydric alcohol, epoxidized fatty acids or their derivatives, epoxidized diene polymers, cyclohexene epoxide derivatives and cyclopentadiene epoxide.

The resins of the present invention are preferably used in paints, construction industry and civil engineering, adhesives, electric appliances and the like by curing them with amines, amide amines or carboxylic anhydrides.

Curing of the resins is the same as that of the common bisphenol A series epoxy resins. That is, the resins of the present invention can be cured with aliphatic amines (e.g. ethylenediamine, diethylenetriamine, triethylenetetramine), alicyclic amines (e.g. piperazine), aromatic amines (e.g. phenylenediamine, diaminodiphenylmethane, diaminodiphenylsulfone), polyamine derivatives (e.g. cyanoethylated polyamines, glycidyl ether/polyamine adducts), polyamides (e.g. dimer acid/diamine condensates), polyamides having an active amino group (e.g. dicyandiamide), polybasic carboxylic acids (e.g. phthalic acid, maleic acid, fumaric acid, trimellitic acid, oxalic acid, citric acid, pyromellitic acid, malonic acid, succinic acid, adipic acid, sebacic acid, tetrahydrophthalic acid, hexahydrophthalic acid, nadic acid, methylnadic acid, Het acid) or acid anhydrides thereof, Friedel-Crafts type metal halides, phenol/formaline initial condensates, methylol group-containing compounds (e.g. methylol urea) and the like. The resins of the present invention may be modified by reaction with the usual epoxy modifiers.

The present invention will be illustrated in more detail with reference to the following examples and application examples, but the present invention is not limited to these examples.

REFERENCE EXAMPLE 1

(Production of m-isopropenylphenol oligomer)

One hundred parts by weight of m-isopropenylphenol was added to a reactor equipped with a thermometer and a stirrer, and the reaction system was kept at 180° C. with stirring. After 10 hours, the system was distilled at 160° C. under reduced pressure of 5 mmHg to remove unreacted m-isopropenylphenol. Thus, 82 parts by weight of a pale yellow solid having a softening point of 85° C. [oligomer (I)] was obtained.

By the analysis of the oligomer (I), the following results were obtained:

A number average molecular weight was 348. By infrared absorption spectrum, it was found that the oligomer had the absorption band of a phenolic hydroxyl group at 3350 cm$^{-1}$ like m-isopropenylphenol. The acetylated product of the oligomer was separated into two components supposed as a dimer by thin layer chromatography, and both of the two components proved to have a molecular weight of 352 by mass spectrum. Further, both of the two components proved to have no olefinic double bonds and to have the same structure as 1,3,3-trimethyl-1-phenylindane derivatives by nuclear magnetic resonance spectrum.

By the $^{13}$C-nuclear magnetic resonance spectrum, the two components were identified as 1,3,3-trimethyl-1-m-hydroxyphenyl-indane-5-ol and 1,3,3-trimethyl-1-m-hydroxyphenyl-indane-7-ol, respectively.

By gas-chromatography, it was found that the weight ratio of former component to latter one was about 65 to 35.

Further, the same analytical results were obtained with trimer components or more. Thus, the oligomer (I) was identified as a mixture of oligomers having the following formulae, respectively (weight ratio, about 65:35),

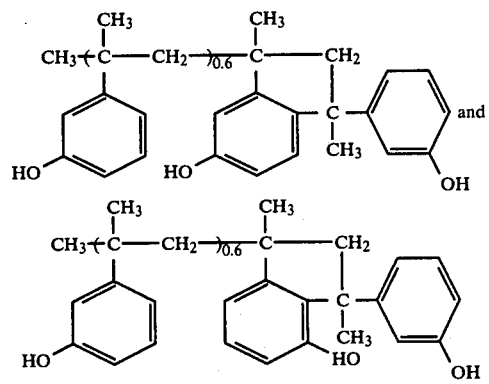

REFERENCE EXAMPLE 2

(Production of m-isopropenylphenol oligomer)

The polymerization was carried out in completely the same manner as in Reference example 1 except that the reaction system was kept at 210° C. for 8 hours. Thus, 95 parts by weight of a pale yellow solid having a softening point of 94° C. was obtained [oligomer (II)].

By the analysis of the oligomer (II), the oligomer (II) proved to have a number average molecular weight of 430 and it was identified as a mixture of oligomers having the following formulae, respectively (weight ratio, about 70:30),

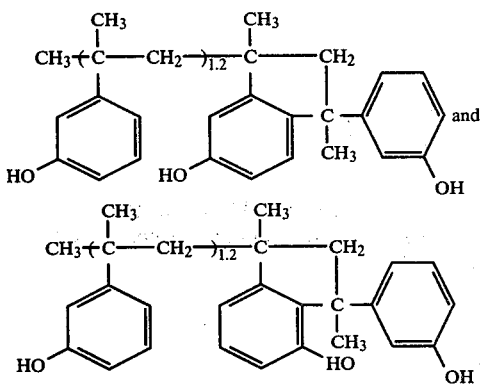

EXAMPLES 1 TO 5

(Production of resin)

A reactor was equipped with a thermometer, stirrer, dropping funnel and apparatus for condensing an azeotropic mixture of epihalohydrin and water and returning the separated epihalohydrin layer to the reactor. To the reactor were added various kinds of m-isopropenylphenol oligomer and epihalohydrin in proportions shown in Table 1. The mixed solution was heated under reflux, and 87.5 parts by weight of 48% aqueous sodium hydroxide solution was added dropwise thereto over 3.5 hours. The rate of addition of the aqueous solution and heating of the reactor were adjusted to keep the temperature of the reaction system at 97° to 119° C. In the course of the reaction, water and epihalohydrin were distilled off the reactor, and the separated epihalohydrin layer alone was returned to the reactor. After addition of the aqueous sodium hydroxide solution was finished, heating of the reaction system was continued to heat for further 15 minutes to remove water completely. Thereafter, unreacted epihalohydrin was removed by distillation. In order to facilitate the separation of sodium chloride from the crude product, about 100 parts by weight of toluene was added to dissolve the crude product, and then the solution was filtered to remove sodium chloride. Finally, the filtrate was heated to 150° C. under reduced pressure of 20 mmHg to distill off toluene completely. Thus, a pale yellow, highly viscous liquid was obtained.

Table 1

| Example | Feed amount | | Epoxy group/ phenolic hydroxyl group |
|---|---|---|---|
| | m-Isopropenyl-phenol oligomer (part by weight) | Epihalohydrin (part by weight) | |
| 1 | Oligomer (I), 134 | Epichlorohydrin 463 | 5 |
| 2 | Oligomer (I), 134 | Epichlorohydrin 648 | 7 |
| 3 | Oligomer (I), 134 | Epichlorohydrin 185 | 2 |
| 4 | Oligomer (II), 134 | Epichlorohydrin 463 | 5 |
| 5 | Oligomer (I), 134 | β-Methylepichlorohydrin 533 | 5 |

In the above-described examples, the resins, No. 1 to No. 3, are each a mixture of the following two compounds (weight ratio, about 65:35),

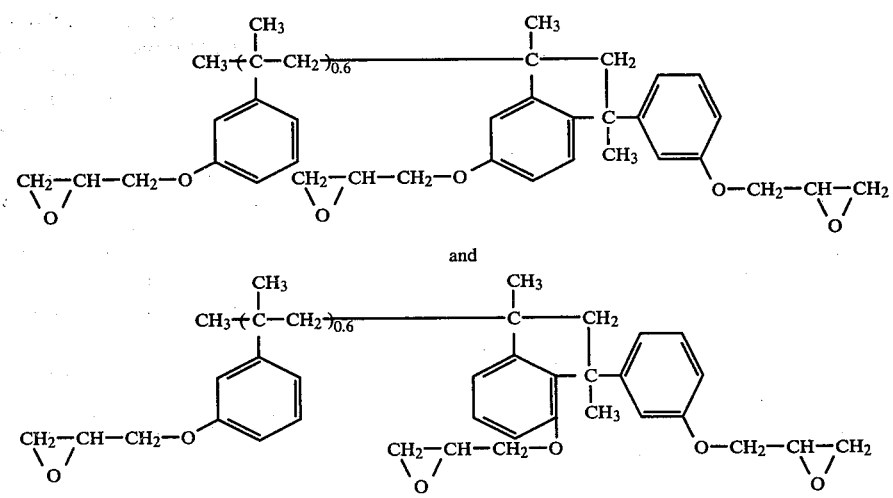

The resin, No. 4, is a mixture of the following two compounds (weight ratio, about 70:30),

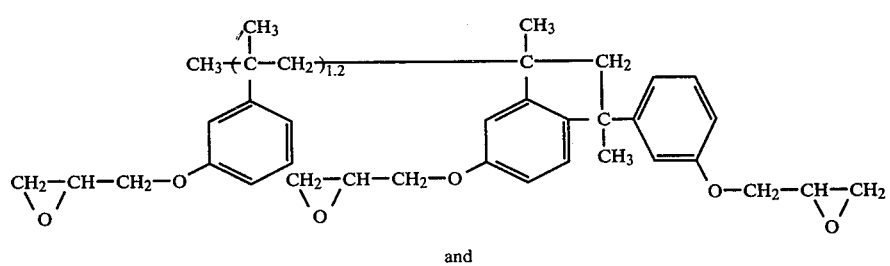

and

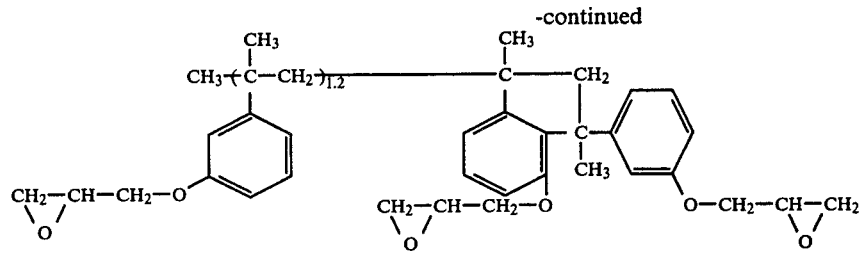

Also, the resin, No. 5, is a mixture of the following two compounds (weight ratio, about 65:35),

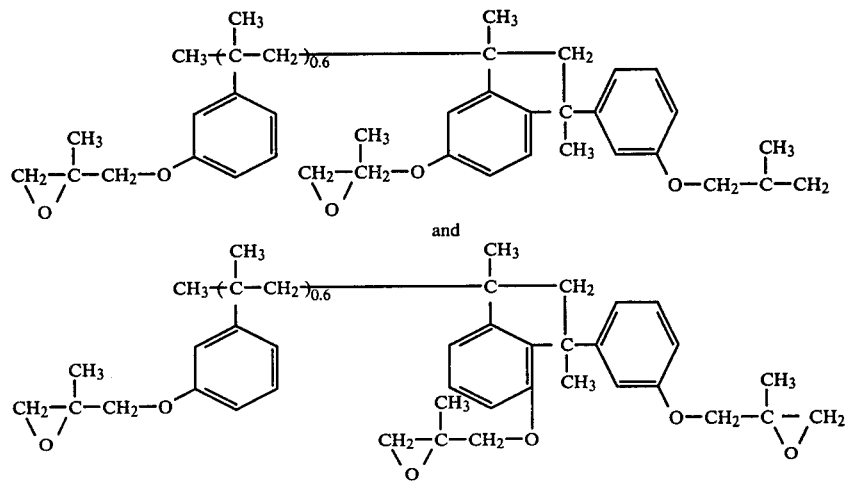

The physical properties of these resins are shown in Table 2.

Table 2

| Resin | No. 1 | No. 2 | No. 3 | No. 4 | No. 5 |
|---|---|---|---|---|---|
| Epoxy equivalent (g/equiv.) | 218 | 215 | 296 | 220 | 231 |
| Hydrolyzable chlorine (weight %) | 0.03 | 0.02 | 0.04 | 0.02 | 0.05 |
| Number average molecular weight | 508 | 510 | 690 | 609 | 530 | agent, referred to as "MNA" hereinafter) and benzyldimethylamine (a cure accelrator, referred to as "BD" hereinafter) in stoichiometric amounts. The mixture was heated, and the gel time and the physical properties of the products which were hardened at 80° C.×2 hours, 120° C.×2 hours and further 150° C.×2 hours were measured according to JIS K 6911.

For comparison, the same tests were carried out using Sumi-epoxy ELA-128 (a trade name of Sumitomo Chemical Co., Ltd.; bisphenol A type epoxy resin having an epoxy equivalent of 190), and an epoxy resin having an epoxy equivalent of 218 which is produced from m-isopropenylphenol dimer in the same manner as in Example 1.

These results are shown in Table 3.

Table 3

| | | Present example | | | | Comparative example | |
|---|---|---|---|---|---|---|---|
| Application example | | 1 | 2 | 3 | 4 | 5 | 6 |
| Epoxy resin used | | No. 1 | No. 3 | No. 4 | No. 5 | Sumi-epoxy ELA 128 | Epoxidized product of dimer |
| Feed amount (part by weight) | Epoxy resin | 100 | 100 | 100 | 100 | 100 | 100 |
| | MNA/BD | 71/1 | 53/1 | 71/1 | 68/1 | 82/1 | 71/1 |
| Gel time (at 150° C.) | | 4'17" | 4'01" | 4'02" | 4'20" | 5'46" | 5'30" |
| Gel time (at 130° C.) | | 10'20" | 9'40" | 9'59" | 10'33" | 13'00" | 12'45" |
| Physical properties of hardened product | Heat distortion temperature (°C.) | 130 | 124 | 135 | 127 | 111 | 118 |
| | Hardness (barcol) | 45 | 43 | 49 | 44 | 37 | 39 |
| | Flexural strength (kg/cm$^2$) | 16.8 | 16.5 | 18.0 | 16.7 | 16.1 | 16.4 |
| | Flexural modulus (kg/cm$^2$) | 365 | 350 | 380 | 365 | 350 | 352 |
| | Rate of flexural bending (mm/mm) | 0.101 | 0.140 | 0.096 | 0.109 | 0.086 | 0.093 |
| | Sharpy impact strength (kg . cm/cm$^2$) | 4.3 | 6.1 | 4.2 | 4.3 | 3.3 | 3.8 |

APPLICATION EXAMPLE 1

To each of the resins obtained in Examples 1, 3, 4 and 5 were added methylnadic anhydride (a hardening

What is claimed is:

1. An epoxy resin of the formulae,
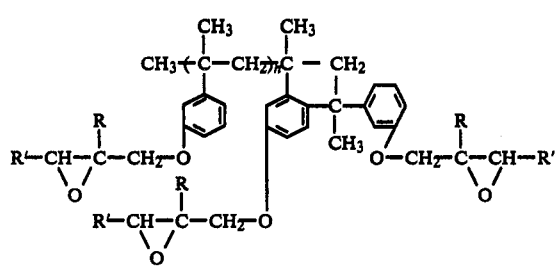
and
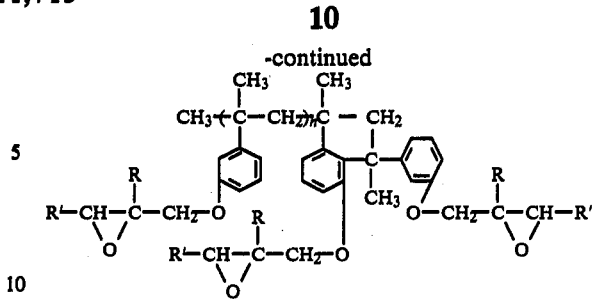
wherein R and R' are each a hydrogen atom or an alkyl group having 1 to 3 carbon atoms and n is a mean value satisfying the equation, $0 < n \leq 2$.
2. The epoxy resin of claim 1 having an epoxy equivalent of about 190 to about 300.
* * * * *